United States Patent
Lehmann

(10) Patent No.: US 11,713,381 B2
(45) Date of Patent: Aug. 1, 2023

(54) MODIFIED PLASTIC SURFACES WITH PERFLUOROPOLYMERS AND METHOD FOR PRODUCING SAME

(71) Applicants: LEIBNIZ-INSTITUT FÜR POLYMERFORSCHUNG DRESDEN E.V., Dresden (DE); Marlies Lehmann, Coswig (DE)

(72) Inventor: Dieter Lehmann, Dresden (DE)

(73) Assignee: LEIBNiZ-INSTITUT FÜR POLYMERFORSCHUNG DRESDEN E.V., Dresden (DE)

( * ) Notice: Subject to any disclaimer, the term of this patent is extended or adjusted under 35 U.S.C. 154(b) by 710 days.

(21) Appl. No.: 16/625,160

(22) PCT Filed: Jun. 14, 2018

(86) PCT No.: PCT/EP2018/065806
§ 371 (c)(1),
(2) Date: Dec. 20, 2019

(87) PCT Pub. No.: WO2018/234149
PCT Pub. Date: Dec. 27, 2018

(65) Prior Publication Data
US 2021/0403664 A1      Dec. 30, 2021

(30) Foreign Application Priority Data

Jun. 23, 2017 (DE) .................... 102017210656.5

(51) Int. Cl.
*C08J 7/18* (2006.01)
*C08J 7/04* (2020.01)
*C09D 127/12* (2006.01)
*C09D 5/03* (2006.01)

(52) U.S. Cl.
CPC .............. *C08J 7/18* (2013.01); *C08J 7/0427* (2020.01); *C09D 5/031* (2013.01); *C09D 127/12* (2013.01); *C08J 2309/02* (2013.01); *C08J 2427/12* (2013.01)

(58) Field of Classification Search
CPC ........ C08J 7/18; C08J 7/0727; C08J 2427/12; C09D 127/12
See application file for complete search history.

(56) References Cited

U.S. PATENT DOCUMENTS

| | | |
|---|---|---|
| 5,576,106 A | 11/1996 | Kerbow et al. |
| 2010/0249333 A1 | 9/2010 | Lehmann et al. |

FOREIGN PATENT DOCUMENTS

| | | |
|---|---|---|
| DE | 100 42 566 | 3/2002 |
| DE | 103 51 812 A1 | 6/2005 |
| DE | 103 51 813 A1 | 6/2005 |
| DE | 103 51 814 | 6/2005 |
| DE | 10 2004 016 873 A1 | 10/2005 |
| DE | 10 2004 016 876 | 10/2005 |
| DE | 103 51 812 B4 | 4/2006 |
| DE | 103 51 813 B4 | 4/2006 |
| DE | 10 2006 041 511 | 3/2008 |
| DE | 10 2007 055 927 | 6/2009 |
| DE | 10 2011 083 076 | 3/2013 |
| DE | 10 2013 216 649 | 3/2014 |
| DE | 10 2004 016 873 B4 | 9/2014 |
| DE | 10 2013 216 650 | 2/2015 |
| DE | 10 2013 216 651 | 2/2015 |
| DE | 10 2013 216 652 | 2/2015 |
| DE | 10 2014 225 670 | 6/2016 |
| DE | 10 2014 225 671 | 6/2016 |
| WO | 2005/042599 | 5/2005 |
| WO | 2016/091936 | 6/2016 |

OTHER PUBLICATIONS

K. Lunkwitz et al., "Modification of perfluorinated polymers by high-energy irradiation", Journal of Fluorine Chemistry 125 (2004), ., pp. 863-873.
A. Heger et al., "Technologic der Strahlenchemie von Polymeren.", Akademie-Verlag Berlin 1990, pp. 207-252.
Ferse et al., "Modifiziertes Feinpulver aus Polytetrafluorethylen.", Plaste u. Kautschuk, 29 (1982), 458, DD 146 716, ., pp. 458-465.
J. Klose et al., "Oberflachenmodifizierung von Elastomeren mit dem Verfahren der aktivierten Halogenierung.", Dichtungstechnik, Jahrbuch 2014, ., pp. 268-282.
Zhubo Liu et al., "Growth feature of PTFE coatings on rubber substrate by low-energy electron bean dispersion: Growth Feature of PTFE Coatings on Rubber", Polymers for Advanced Technologies, Bd. 27, Nr. 6, XP055501510, G, ISSN: 1042-7147, DOI: 10.1002/pat.3723, Nov. 11, 2015, pp. 823-829.
Official Communication issued in International Bureau of WIPO Patent Application No. PCT/EP2018/065806, dated Sep. 4, 2018, along with an English translation thereof.

*Primary Examiner* — Catherine S Branch
(74) *Attorney, Agent, or Firm* — Greenblum & Bernstein, P.L.C.

(57) ABSTRACT

Modified plastic surfaces with perfluoropolymers are provided, whereby plastic surfaces that are intended for use under tribological conditions have substantially improved assembly properties and/or sliding friction properties and exhibit a very low degree of wear. Accordingly, modified plastic surfaces with perfluoropolymers are provided in which modified perfluoropolymer (micro)powders are present at the surface of plastics that comprise olefinically unsaturated double bonds at least at the surface such that the modified perfluoropolymer (micro)powders are chemically covalently bonded via a radical coupling of the olefinically unsaturated double bonds with perfluoropolymer (peroxy) radicals of the modified perfluoropolymer (micro)powders after a reactive conversion under mechanical stress at room temperature.

19 Claims, No Drawings

MODIFIED PLASTIC SURFACES WITH PERFLUOROPOLYMERS AND METHOD FOR PRODUCING SAME

The invention concerns the field of chemistry and relates to modified plastic surfaces with perfluoropolymers, which surfaces have improved assembly properties and/or sliding friction properties for use under tribological conditions and exhibit reduced wear and which can in particular be used in mechanical engineering in general and in the specific fields of sealing technology/dynamic sealing systems and automotive engineering, and relates to a method for producing a modification of this type.

Plastics denotes materials which are primarily composed of macromolecules (Wikipedia, German-language keyword "Kunststoffe").

A polymer is a chemical substance which is composed of macromolecules (Wikipedia, German-language keyword "Polymer").

It is known that perfluoroalkyl polymers, such as PTFE and/or PFA for example, are radiation-chemically degraded when exposed to high-energy radiation such as electron beams and/or gamma rays [K. Lunkwitz et al., Journal of Fluorine Chemistry 125 (2004) 863-873].

"When PTFE is irradiated in the presence of oxygen, peroxy and alkoxy radicals are formed from the perfluoroalkyl radicals which initially form . . . .

Via the intermediate stage of alkoxy radical formation, the terminal perfluoroalkyl radical is degraded stepwise, with chain reduction thereby taking place and carbonyl difluoride being formed . . . .

By contrast, perfluoroalkanecarboxylic acid fluorides and terminal perfluoroalkyl radicals are formed from the pendant alkoxy radicals . . . .

Unsintered and unpressed PTFE emulsion and suspension polymerizates have a fibrous, felt-like character. A transfer of the anti-adhesive and sliding properties of the PTFE, for example, to other media by an embedding in aqueous or organic dispersions, polymers, dyes, lacquers, resins, or lubricants is not possible because this PTFE cannot be homogenized and instead tends to form clumps or agglomerates, floats on the surface, or settles out.

Through the application of high-energy radiation at an energy dose of approximately 100 kGy, a free-flowing fine powder is obtained from the fibrous, felt-like polymerizates as a result of a partial degradation of the polymer chains. This powder contains even looser agglomerates which can easily be disaggregated into primary particles with a particle diameter of <5 µm. Where irradiation takes place in the presence of reactants, functional groups are incorporated into the polymer. If the irradiation takes place in air, then . . . (and by the means of subsequent hydrolysis of the —COF groups due to humidity) carboxyl groups are obtained. . . . The positive properties of the PTFE, such as the excellent sliding, separation and dry lubricant properties as well as the high chemical and thermal stability, are preserved . . . " [A. Heger et al., Technologie der Strahlenchemie an Polymeren, Akademie-Verlag Berlin 1990].

In many cases, the incompatibility with other materials has a disadvantageous effect when perfluoroalkyl polymers are irradiated in this manner.

A modification of the PTFE can also be achieved by a chemical activation of PTFE using the known methods involving (1.) sodium amide in liquid ammonia and (2.) alkali alkyl compounds and alkali aromatic compounds in aprotic inert solvents. Improved interfacial interactions can be achieved via these modifications.

The products of the PTFE degradation following an irradiation are used in diverse fields of application, including as an additive to plastics for the purpose of obtaining sliding or anti-adhesive properties, for example. The fine powder substances are present more or less finely dispersed as filler component in a matrix [Ferse et al., Plaste u. Kautschuk, 29 (1982), 458; DD 146 716].

Through the use of PTFE fine powder, an improvement in the properties compared to the commercial fluorocarbon-free additives can be achieved.

According to U.S. Pat. No. 5,576,106 B1, grafted fluorine-containing plastics are known which are composed of fluorine-containing plastic particles such as ETFE, which does not belong to the perfluoropolymers, on the surface of which particles a non-homopolymerized ethylenically unsaturated compound is grafted. The non-homopolymerized ethylenically unsaturated compounds can thereby be acids, esters or anhydrides.

From DE 103 51 812 A1, DE 103 51 813 A1, DE 103 51 814 A1, DE 10 2004 016 873 A1, DE 10 2004 016 876 A1, DE 10 2006 041 511 A1, DE 10 2007 055 927 A1, DE 10 2011 083 076 A1, DE 10 2013 216 649 A1, DE 10 2013 216 650 A1, DE 10 2013 216 651 A1, DE 10 2013 216 652 A1, DE 10 2014 225 670 A1 and DE 10 2014 225 671 A1, a radical coupling/grafting with ethylenically/olefinically unsaturated monomers and/or low-moleculars, such as unsaturated oil(s) for example, and/or macromers and/or oligomers and/or polymers is also known, resulting from a reactive conversion with the perfluoroalkyl (peroxy) radicals of perfluoropolymers, such as PTFE for example, which originate from a radiation-chemical and/or plasma-chemical modification and/or from the polymerization process. The reactive conversions were carried out either in solution, in dispersion, in melt, in paste form, or in a solid extrusion.

Furthermore, plasma polymerization is known as a method for the surface modification of substrates, in which method perfluoro layers are also created directly on the substrate surface, for example.

"Plasma polymerization is a special plasma-activated variant of chemical vapor deposition (PE-CVD).

In plasma polymerization, vaporous organic precursor compounds (precursor monomers) in the process chamber are first activated by a plasma. Ionized molecules are created by the activation, and initial molecular fragments in the form of clusters or chains already form in the gas phase. The subsequent condensation of these fragments on the substrate surface then, under the effects of substrate temperature and electron and ion bombardment, causes the polymerization and thus the formation of a closed layer.

The structure of the resulting "plasma polymers" is comparable to highly crosslinked thermosets, as they form a covalent network which is to a great extent statistical. The deposition of chain polymers in mono- or polycrystalline form is therefore not possible through plasma polymerization." [wikipedia.org/wiki/Plasmapolymerisation].

Furthermore, a method for the tribomodification of elastomers using activated halogenation (radiation bromination) is known [DD 145 757, DD 0154 102, DD 248 132 A1]. Through bromination and subsequent radiation treatment, improved sliding friction properties are achieved [A. Heger et al., "Technologie der Strahlenchemie von Polymeren", first edition, Carl Hanser Verlag, Munich, Vienna, 1990, p. 207-252; J. Klose et al., "Oberflächenmodifizierung von Elastomeren mit dem Verfahren der aktivierten Halogenierung", Dichtungstechnik, Jahrbuch 2014, p. 268-282, Isgatec GmbH Mannheim, ISBN: 978-3-9811509-7-1].

A report from the research association "Verein zur Forderung des Forschungsinstitutes für Leder und Kunststoffbahnen (FILK) Freiberg/Sachsen e.V." on the "prevention of stick-slip frictional instabilities of coated elastomers on microscopically rough and smooth surfaces" is available (BMWi: IGF 15810 BG, date of publication: Dec. 31, 2010). The carbon black-reinforced elastomers SBR and EPDM, which exhibit different glass transition temperatures, degrees of crosslinking or surface roughness, were treated with four different (lubricating) lacquer systems (two-component polyurethane lacquer (PU), thermoplastic polyurethane lacquer (TPU), PU lacquer with particles of polytetrafluoroethylene (PTFE) or polysiloxane). The friction properties of the coated elastomers were tested against model surfaces of steel, automotive glass and lacquered sheet metal. A reactive surface modification for the prevention of stick/slip frictional instabilities was not described.

From DE 100 42 566 A1, a method for modifying plastic surfaces is known, in which method one or more modifier substance(s) is fully or partially brought into contact with the surface of the shaped plastic during or immediately after or after a shaping process, and in which the temperature of the plastic surface is at least the onset temperature of the reaction peak on the DSC curve, wherein substances that enter into a reaction with the surface of the shaped plastic and/or penetrate into the surface due to interdiffusion and/or fuse onto the surface are used as modifier substance(s).

Polyamide, polyester, polycarbonate, TPU, and PVC were thereby surface-modified as plastics, wherein only the conversion of functional groups in substitution reactions was stated as reactions for the modification, which also include the reactions of carbonyl compounds. Furthermore, the examples only describe surface modifications during the injection molding as a basis for the method of "interface-reactive injection molding."

In one specific method from DE 100 42 566 A1, surfaces are passivated for the "production of movable parts from identical materials . . . . Following the production of a plastic preform with a modification of the surface for passivation by means of modifier substances which are composed of compounds having at least one reactive group, wherein preferably perfluorinated and/or fluorine-containing and/or silicon-containing and/or paraffinic, low-molecular and/or oligomeric and/or polymeric compounds or mixtures thereof having at least one functionality are used, one or more additional components can be injected thereagainst, thereon or thereinto. The functionality is used to directly couple a portion of the modifier substance at the surface, under modification and/or a reaction with itself to form thin branched and/or crosslinked films, which films then react with the polymer of the melt surface via a chemical coupling of the residual functionalities and modify the surface . . . . For sufficient separation in the interface between the components for the production of movable parts in assembly injection molding . . . ."

For this purpose, perfluoroheptanoic anhydride is used to surface-modify/passivate PA6 in the injection molding process in Example 15.

"In surface technology, passivation is understood as meaning the spontaneous creation or deliberate production of a protective layer on a metallic material, which layer prevents or markedly retards the corrosion of the base material."[https://de.wikipedia.org/wiki/Passivierung].

A disadvantage of the known solutions from the prior art is the still-inadequate assembly properties and/or sliding friction properties for plastic surfaces which are intended for use under tribological conditions, as well as the degree of wear, which is still too high.

The object of the present invention is to provide modified plastic surfaces with perfluoropolymers, whereby plastic surfaces that are intended for use under tribological conditions have substantially improved assembly properties and/or sliding friction properties and exhibit a very low degree of wear. Furthermore, the object of the present invention is to provide a simple and cost-effective method for producing modified plastic surfaces with perfluoropolymers.

The objects are attained by the invention disclosed in the claims. Advantageous embodiments are the subject matter of the dependent claims.

In the modified plastic surfaces with perfluoropolymers according to the invention, modified perfluoropolymer (micro)powders are present at the surface of plastics that comprise olefinically unsaturated double bonds at least at the surface such that the modified perfluoropolymer (micro)powders are chemically covalently bonded via a radical coupling of the olefinically unsaturated double bonds with perfluoropolymer (peroxy) radicals of the modified perfluoropolymer (micro)powders after a reactive conversion under mechanical stress at room temperature.

Advantageously, molded parts and/or component parts composed of polymers having groups with olefinically unsaturated double bonds in the side chain and/or in the main chain at the surface are present as plastics.

Further advantageously, elastomers/rubber or rubber prior to vulcanization or thermoplastic elastomers or thermoplastics or thermosets are present as polymers with olefinically unsaturated double bonds, each at the surface.

Likewise advantageously, SBR, NBR, HNBR, XNBR, EPDM, BR, IR, NR, SBS, SEBS, SEPS, SEEPS, MBS and mixtures thereof, ABS and blends of ABS with PA or ABS and PC, BMC (bulk molding compound) or SMC (sheet molding compound) on a UP (unsaturated polyester) resin base or vinyl ester resin base as a pre-preg and/or cured material that still has olefinically unsaturated double bonds at the surface, or on an epoxy resin base as a pre-preg and/or cured material, wherein after subsequent modification the surface has groups with olefinically unsaturated double bonds, are present as polymers.

And also advantageously, modified perfluoropolymer (micro)powders are present which have been modified by means of radiation-chemical and/or plasma-chemical treatment.

It is also advantageous if modified PTFE and/or PFA and/or FEP, advantageously PTFE and/or PFA and/or FEP modified by means of radiation-chemical and/or plasma-chemical treatment, are present as modified perfluoropolymer (micro)powders.

It is further advantageous if the surface of the plastics is at least partially or locally, preferably essentially completely or completely, covered and covalently coupled with modified perfluoropolymer (micro)powder.

It is likewise advantageous if modified perfluoropolymer (micro)powders with particle sizes in the range from 60 nm to 500 μm and preferably in the range from 200 nm to 5 μm are present.

In the method according to the invention for producing modified plastic surfaces with perfluoropolymer (micro) powders, modified perfluoropolymer (micro)powders with a perfluoropolymer (peroxy) radical concentration of $>5 \cdot 10^{16}$ spin/$g_{perfluorompolymer}$ are applied at room temperature to a solid surface of plastics that comprise olefinically unsaturated double bonds at least at the surface and a reactive conversion is carried out under mechanical stress during and/or after the application of the modified perfluoropolymer (micro)powders, wherein a subsequent annealing of the plastic surface with the modified perfluoropolymer (micro) powders is excluded.

Advantageously, modified PTFE (micro)powder and/or PFA (micro)powder and/or FEP (micro)powder, advantageously PTFE (micro)powder and/or PFA (micro)powder and/or FEP (micro)powder modified by means of radiation-chemical and/or plasma-chemical treatment, are used as modified perfluoropolymer (micro)powders.

Likewise advantageously, radiation-chemically modified perfluoropolymer (micro)powders are used which have been modified with a radiation dose of >50 kGy and preferably >100 kGy and have a concentration of perfluoropolymer (peroxy) radicals >$10^{18}$ spin/$g_{perfluoropolymer}$.

Further advantageously, modified perfluoropolymer (micro)powders are used which have been radiation-chemically modified in the presence of reactants and preferably with exposure to oxygen.

And also advantageously, molded parts and/or component parts composed of polymers having groups with olefinically unsaturated double bonds in the side chain and/or in the main chain at least at the surface are used as plastics and modified.

It is also advantageous if elastomers/rubber or rubber prior to vulcanization or thermoplastic elastomers or thermoplastics or thermosets are used as polymers with olefinically unsaturated double bonds, each at the surface.

It is further advantageous if SBR, NBR, HNBR, XNBR, EPDM, BR, IR, NR, SBS, SEBS, SEPS, SEEPS, MBS and mixtures thereof, ABS and blends of ABS with PA or ABS and PC, BMC (bulk molding compound) or SMC (sheet molding compound) on a UP (unsaturated polyester) resin base or vinyl ester resin base as a pre-preg and/or cured material that still has olefinically unsaturated double bonds at the surface, or on an epoxy resin base as a pre-preg and/or cured material, wherein after subsequent modification the surface has groups with olefinically unsaturated double bonds, are used as polymers.

It is likewise advantageous if the modified perfluoropolymer (micro)powders are applied to the plastic surface at room temperature, preferably at 18 to 25° C.

And it is also advantageous if modified perfluoropolymer (micro)powders are applied to a solid plastic surface which has a temperature of up to 200° C., preferably 150° C.

It is also advantageous if the reactive conversion is achieved under mechanical stress
- via compressive stress, such as rubbing and/or brushing and/or ultrasound without or with carrier bodies composed of metal and/or ceramic and/or plastic and/or
- via stressing by accelerated carrier bodies composed of metal and/or ceramic and/or plastic, wherein the mechanical stress is applied during and/or after the application of the radiation-chemically and/or plasma-chemically modified perfluoropolymer (micro)powders to the solid plastic surface.

And it is also advantageous if the application of the modified perfluoropolymer (micro)powders is carried out before the reactive conversion under mechanical stress and the modified perfluoropolymer (micro)powder is positioned on the solid plastic surface via electrostatic adsorption.

With the present invention, it becomes possible for the first time to provide modified plastic surfaces with perfluoropolymers, whereby plastic surfaces that are intended for use under tribological conditions have substantially improved assembly properties and/or sliding friction properties and exhibit a very low degree of wear. Likewise, it becomes possible for the first time to produce modified plastic surfaces of this type with a simple and cost-effective method.

This is achieved by modified plastic surfaces with perfluoropolymers, with which surfaces modified perfluoropolymer (micro)powders are present at the surface of plastics that comprise olefinically unsaturated double bonds at least at the surface such that the modified perfluoropolymer (micro)powders are chemically covalently bonded via a radical coupling of the olefinically unsaturated double bonds with perfluoropolymer (peroxy) radicals of the perfluoropolymer (micro)powders after a reactive conversion under mechanical stress.

Within the scope of the invention, olefinically unsaturated double bonds are to be understood as meaning both olefinic double bonds and also ethylenically unsaturated double bonds or ethylenic double bonds which are present in unsaturated compounds.

Within the scope of this invention, perfluoropolymer (peroxy) radicals are to be understood as meaning all radicals of perfluoropolymers, in particular also perfluoroalkyl (peroxy) radicals, which are created either during the production of the perfluoropolymers and/or during a subsequent modification, such as a radiation-chemical and/or plasma-chemical modification, for example.

With the solution according to the invention, modified perfluoropolymer (micro)powders which have perfluoropolymer (peroxy) radicals are chemically covalently coupled with plastic surfaces which comprise olefinically unsaturated double bonds at least at the surface, whereby the plastic surfaces that are intended for use under tribological conditions have substantially improved tribological properties.

Advantageously, molded parts and/or component parts composed of polymers having groups with olefinically unsaturated double bonds in the side chain and/or in the main chain are present as plastics, wherein the polymers with olefinically unsaturated double bonds at the surface can advantageously be elastomers/rubber or rubber prior to vulcanization or thermoplastic elastomers or thermoplastics or thermosets, each at the surface, such as SBR, NBR, HNBR, XNBR, EPDM, BR, IR, NR, SBS, SEBS, SEPS, SEEPS, MBS and mixtures thereof, ABS and blends of ABS with PA or ABS and PC, BMC (bulk molding compound) or SMC (sheet molding compound) on a UP (unsaturated polyester) resin base or vinyl ester resin base as a pre-preg and/or cured material that still has olefinically unsaturated double bonds at the surface.

Advantageously, modified PTFE and/or PFA and/or FEP are present as modified perfluoropolymer (micro)powders.

Within the scope of the invention, modified perfluoropolymer (micro)powders are to be understood as meaning perfluoropolymer (micro)powders which, as starting materials for the method according to the invention, at least comprise perfluoropolymer (peroxy) radicals that originate from the production process and/or were generated in a radiation-chemical modification, wherein after a reactive conversion the modified perfluoropolymer (micro)powders are then present such that they are chemically covalently bonded with the olefinically unsaturated double bonds on the plastic surface as a result of a reaction of the radicals.

The perfluoropolymer (peroxy) radicals can, for example, thereby have been created during the polymerization of the perfluoropolymer (micro)powders and/or preferably through radiation-chemical and/or plasma-chemical treatment.

Advantageously, perfluoropolymer (micro)powders are present which have been modified by means of radiation-chemical and/or plasma-chemical treatment.

The radical coupling takes place between the olefinically unsaturated double bonds of the plastics, which double bonds are present at the surface, with perfluoropolymer (peroxy) radicals of the perfluoropolymer (micro)powders so that the perfluoropolymer (micro)powders are chemically covalently bonded to the plastic surface.

The surface of the plastics should thereby be covered with perfluoropolymer (micro)powder in a locally delimited manner and/or at least partially, preferably essentially completely or completely.

Powders with particle sizes in the range of 60-80 nm (lower primary particle size of special PTFE emulsion polymers) to 500 µm (agglomerates, agglomerated perfluoropolymer particles), preferably in the rage of 200 nm to 5 µm, are present as perfluoropolymer (micro)powders.

With the plastic surfaces modified according to the invention, plastic molded parts and/or plastic component parts are present with which, as a result of the perfluoropolymer (micro)powders applied and covalently coupled under mechanical stress, a perfluoropolymer solid lubricant is present on the plastic molded part surface and/or plastic component part surface, which lubricant is chemically coupled and fixed in this location.

Thus, in tribological applications of the plastic molded parts and/or plastic component parts, substantially improved assembly properties and/or sliding friction properties are present as well as a very low degree of wear, which also results in a longer service life of the plastic molded parts and/or plastic component parts.

In the method according to the invention, modified perfluoropolymer (micro)powders with a perfluoropolymer (peroxy) radical concentration of $>5 \cdot 10^{16}$ spin/$g_{perfluoropolymer}$ are applied at room temperature to a solid surface of plastics that comprise olefinically unsaturated double bonds at least at the surface, and a reactive conversion is carried out under mechanical stress in this location during and/or after the application of the modified perfluoropolymer (micro)powders, wherein a subsequent annealing of the plastic surface with the modified coupled perfluoropolymer (micro)powders is excluded Advantageously, radiation-chemically and/or plasma-chemically modified perfluoropolymer (micro)powders are used as perfluoropolymer (micro)powders with a perfluoropolymer (peroxy) radical concentration of $>5 \cdot 10^{16}$ spin/$g_{perfluoropolymer}$.

Advantageously used as modified perfluoropolymer (micro)powders of this type are PTFE powders and/or PFA powders and/or FEP powders with perfluoroalkyl (peroxy) radicals from the polymerization process, more advantageously radiation-chemically and/or plasma-chemically modified PTFE powders and/or PFA powders and/or FEP powders.

In particular, the radiation-chemically modified perfluoropolymer (micro)powders thereby have been modified with a radiation dose of $>50$ kGy and preferably $\geq 100$ kGy and have a concentration of perfluoroalkyl (peroxy) radicals of $>5 \cdot 10^{16}$ spin/$g_{perfluoropolymer}$ and preferably $>10^{18}$ spin/$g_{perfluoropolymer}$.

In the case of the radiation-chemical modification of the perfluoropolymer (micro)powders, it is further advantageous to carry this out in the presence of reactants and preferably with exposure to oxygen.

Through the radiation-chemical and/or plasma-chemical treatment of the perfluoropolymer (micro)powders, perfluoropolymer (peroxy) radicals as well as functional groups are generated, wherein in the presence of oxygen perfluoropolymer peroxy radicals are created during the treatment for oxygen-accessible radicals at the perfluoropolymer particle surface.

According to the invention, plastic surfaces in the form of molded parts and/or component parts composed of polymers are modified which at least comprise olefinically unsaturated double bonds at least at the surface, wherein these olefinically unsaturated double bonds can advantageously also be part of groups of the side chain and/or in the main chain of the polymers.

Advantageously, elastomers/rubber or rubber prior to vulcanization or thermoplastic elastomers or thermoplastics or thermosets are used as polymers with olefinically unsaturated double bonds, each at the surface, such as SBR, NBR, HNBR, XNBR, EPDM, BR, IR, NR, SBS, SEBS, SEPS, SEEPS, MBS and mixtures thereof, ABS and blends of ABS with PA or ABS and PC, BMC (bulk molding compound) or SMC (sheet molding compound) on a UP (unsaturated polyester) resin base or vinyl ester resin base as a pre-preg and/or cured material that still has olefinically unsaturated double bonds at the surface.

In the method according to the invention, it is of particular significance on the one hand that the modified perfluoropolymer (micro)powders with a perfluoropolymer (peroxy) radical concentration of $>5 \cdot 10^{16}$ spin/$g_{perfluoropolymer}$ are applied to the plastic surface at room temperature, preferably at 18-25° C.

The solid plastic surface can thereby advantageously have a temperature of up to 200° C., preferably 150° C., wherein the ordinarily skilled artisan will select the temperature accordingly, thereby taking into account the thermal stability and above all the thermal dimensional stability of the material used for the molded part or component part.

On the other hand, it is of importance that the reactive conversion takes place under mechanical stress, which can advantageously be
- a compressive stress, such as rubbing and/or brushing and/or ultrasound without or with carrier bodies composed of metal and/or ceramic and/or plastic and/or
- a stressing by accelerated carrier bodies composed of metal and/or ceramic and/or plastic after the application of the modified perfluoropolymer (micro)powder to the molded part surface or component part surface and/or
- a stressing by accelerated carrier bodies composed of metal and/or ceramic and/or plastic together with the modified perfluoropolymer (micro)powder and/or
- a stressing by accelerated carrier bodies composed of metal and/or ceramic and/or plastic, to which bodies the modified perfluoropolymer (micro)powder was previously applied in an adsorptive manner.

It is thereby advantageous if the modified perfluoropolymer (micro)powder with a perfluoropolymer (peroxy) radical concentration of $>5 \cdot 10^{16}$ spin/$g_{perfluoropolymer}$ is positioned on the solid plastic surface via electrostatic adsorption during and after the application. In this manner, a movement of the plastic surface prior to the mechanical stress is possible and the powder cannot change its position on the surface, or cannot significantly do so; that is, the powder is electrostatically fixed.

The chemical coupling between the plastic surface and the perfluoropolymer (micro)powder is first achieved through the mechanical stressing according to the invention of the modified perfluoropolymer (micro)powders with a perfluoropolymer (peroxy) radical concentration of $>5 \cdot 10^{16}$ spin/$g_{perfluoropolymer}$ during and/or after the application to the solid plastic surface at room temperature. The chemical coupling takes place via a reaction of the perfluoropolymer (peroxy) radicals of the modified perfluoropolymer (micro) powders with the olefinically unsaturated double bonds at the plastic surface, with covalent bonds thereby being formed, whereby perfluoropolymer particles are fixed on the plastic surface.

It is thereby of importance that, as a result of the advantageously radiation-chemical and/or plasma-chemical treatment of the perfluoropolymer (micro)powders, most of the generated perfluoropolymer (peroxy) radicals and functional groups are however not located directly on the perfluoropolymer particle surface, but rather in the amorphous, surface-proximate regions of the perfluoropolymer particles and, being covered by perfluoropolymer chains, are not freely accessible and are thus sterically hindered from reacting.

Through the reactive conversion under mechanical stress, the perfluoropolymer chains of the powder particles are moved and perfluoropolymer (peroxy) radicals that were previously covered by the perfluoropolymer chains are thus exposed and can take part in the reaction with the olefinically unsaturated double bonds of the plastic surface, which reaction only takes place if there is direct contact between radicals and double bonds, and can thus achieve a considerably stronger and more stable covalent coupling of the powder on the plastic surface as opposed to an interaction that is only adsorptive and/or electrostatic.

In contrast to the solutions from the prior art, in which perfluoropolymer (micro)powder particles are applied and fixed to plastic surfaces with an application of increased pressure and temperature, it is necessary according to the invention to achieve the exposure of the perfluoropolymer (peroxy) radicals through a mechanical stressing of the surface-proximate regions of the perfluoropolymer (micro) powder particles, whereby the radical coupling reaction can then take place to a sufficient extent.

The mechanical stress is, for example, effected by methods such as
- a rubbing of the pure modified perfluoropolymer (micro) powder on the plastic surface by means of an opposing body and/or
- a rubbing in combination with carrier bodies composed of metal and/or ceramic and/or plastic together with modified perfluoropolymer (micro)powder and/or
- a rubbing in combination with carrier bodies composed of metal and/or ceramic and/or plastic, on the surface of which bodies modified perfluoropolymer (micro)powder is present such that it is adsorbed by means of charges/electrostatically, and/or
- a brushing of the modified perfluoropolymer (micro) powder on the plastic surface and/or
- a brushing of the modified perfluoropolymer (micro) powder in combination with carrier bodies composed of metal and/or ceramic and/or plastic and/or
- ultrasound (vibrations), in that the sonotrode rubs in modified perfluoropolymer (micro)powder directly as an opposing body on the plastic surface across the entire area or locally and/or
- ultrasound (vibrations), in that the sonotrode rubs in modified perfluoropolymer (micro)powder as an opposing body in combination with carrier bodies composed of metal and/or ceramic and/or plastic on the plastic surface across the entire area or locally and/or
- ultrasound (vibrations), in that the sonotrode excites a container in which plastic component parts/plastic molded parts are positioned together with modified perfluoropolymer (micro)powder and (carrier) bodies composed of metal and/or ceramic and/or plastic, preferably in the form of balls, and/or
- a modification in a vibrating mill in which the plastic component parts/plastic molded parts are positioned together with modified perfluoropolymer (micro)powder and (carrier) bodies composed of metal and/or ceramic and/or plastic, preferably in the form of balls, and/or
- a modification with a shaker/vibrator in which the plastic component parts/plastic molded parts with modified perfluoropolymer (micro)powder on the surface are positioned directly with an opposing body or together with (carrier) bodies composed of metal and/or ceramic and/or plastic, preferably in the form of balls, and/or
- a modification in a tumbling dryer in which the plastic component parts/plastic molded parts are positioned together with modified perfluoropolymer (micro)powder and (carrier) bodies composed of metal and/or ceramic and/or plastic, preferably in the form of balls, and/or
- accelerated carrier bodies composed of metal or ceramic or glass or plastic, on the surface of which bodies the modified perfluoropolymer (micro)powder is present such that it is absorbed by means of charges/electrostatically and which bodies are projected in an accelerated manner onto the plastic surface by means of compressed air [for example, www.kst-hagen.de, Kugelstrahltechnik GmbH Hagen] or by a twister [www.twister-sand-strahl-anlage.de, BMF GmbH, Chemnitz] in the form of a modified/adapted (sand) blasting method, and/or
- accelerated carrier bodies composed of metal or ceramic or plastic which are projected onto the plastic surface in an accelerated manner together with the modified perfluoropolymer (micro)powder and which are projected onto the plastic surface in an accelerated manner by means of compressed air in the form of a modified/adapted sandblasting method, and/or
- accelerated carrier bodies composed of metal or ceramic or plastic, on the surface of which bodies the modified perfluoropolymer (micro)powder is present such that it is adsorbed by means of charges/electrostatically and which bodies, in the case of magnetic carrier materials, are projected in an electromagnetically accelerated manner onto the plastic surface, and/or
- accelerated carrier bodies composed of metal or ceramic or plastic, which bodies are projected onto the plastic surface in an accelerated manner together with the modified perfluoropolymer (micro)powder and, in the case of magnetic carrier materials, are projected in an electromagnetically accelerated manner onto the plastic surface.

The individual method types for the mechanical stress can be used separately or, where technically feasible, also in a combined manner to modify the plastic surfaces. Furthermore, the use as an individual method or as a combined method also depends on whether a plastic surface is to be modified only locally or across the entire area, which the ordinarily skilled artisan can easily decide and test in a few trials.

In the method according to the invention for surface-modifying plastics for tribological applications, the modified perfluoropolymers according to the invention are used as (micro)powder and are chemically coupled/fixed on the plastic surface.

However, these modified perfluoropolymer (micro)powders can also be used in a bonded form, such as where the powders are processed into a paste or a concentrated dispersion or are in the form of a spray for example, for the surface modification according to the invention. Accordingly, in individual methods for the surface modification of plastics for tribological applications, radiation-chemically and/or plasma chemically modified perfluoropolymers can be applied to a plastic surface as a paste, as a concentrated dispersion, or in the form of a spray, and can be chemically coupled/fixed on the plastic surface under mechanical stress (preferably by a rubbing, brushing and/or by means of ultrasound).

Before the radical coupling reaction, the modified perfluoropolymer (micro)powder has a concentration of perfluoropolymer (peroxy) radicals of $>5\cdot10^{16}$ spin/$g_{perfluoropolymer}$, advantageously of $>10^{17}$ spin/$g_{perfluoropolymer}$, and should preferably have $>10^{18}$ spin/$g_{perfluoropolymer}$, wherein the actual concentration of accessible perfluoropolymer (peroxy) radicals in the surface-proximate region is crucial, which in this location has at least the concentration of $>5\cdot10^{16}$ spin/$g_{perfluoropolymer}$ according to the invention.

For the radiation-chemical and/or plasma-chemical modification, the perfluoropolymer (micro)powders can be used in pure form or as a mixture, wherein appropriately modified and preprocessed reclaimed/recycled materials can also be used. It has proven advantageous to pulverize radiation-chemically and/or plasma-chemically modified perfluoropolymer (micro)powders, but it is not absolutely necessary. The radiation-chemical and/or plasma-chemical modification of the perfluoropolymer (micro)powders is carried out according to known methods in that the perfluoropolymer (micro)powder is irradiated with high-energy electromagnetic radiation such as gamma rays and/or X-rays and/or particle radiation such as electron beams at a radiation dose of at least 50 kGy and advantageously ≥100 kGy under inert gas or in the presence of reactants such as for example (atmospheric) oxygen, and in that in this manner a concentration of $>5\cdot10^{16}$ spin/$g_{perfluoropolymer}$ and preferably $>10^{18}$ spin/$g_{perfluoropolymer}$ of perfluoropolymer (peroxy) radicals in the surface-proximate region of the perfluoropolymer (micro)powder particles is created for the radical coupling with the plastic surface. The irradiation of perfluoropolymer (micro)powders with radiation doses of 100 to 2000 kGy has proven technically advantageous, wherein the generated radical concentrations are highly dependent on the respective radiation system and on the type of perfluoropolymer (micro)powder used. On the other hand, specially polymerized and/or plasma-treated perfluoropolymer (micro)powders with a concentration of $>5\cdot10^{16}$ spin/$g_{perfluoropolymer}$ of perfluoropolymer (peroxy) radicals in the surface-proximate region of the perfluoropolymer (micro)powder particles from the polymerization process and/or plasma modification process can also be used.

Surprisingly, it was shown that the perfluoropolymer (peroxy) radicals in the surface-proximate region of the perfluoropolymer (micro)powder particles, which radicals are exposed by the mechanical stress during the reactive conversion, provide enough coupling sites that the chemical coupling is achieved through covalent bonding of the modified perfluoropolymer (micro)powders on the plastic surface.

A heating of the plastic molded part/plastic component part to "the onset temperature of the reaction peak on the DSC curve," such as that required according to DE 100 42 566 A1, is not necessary according to the invention.

However, taking the thermal stability of the material as well as the thermal dimensional stability into account, a heating of the plastic surface or of the entire component part can be carried out up to 200° C. and preferably up to 150° C., wherein the surface of the plastic must necessarily maintain the solid aggregate state and must withstand the mechanical stress.

Under mechanical and therefore also tribological stress during the modification of the plastic surfaces and/or in the application case, the chemically coupled perfluoropolymer (micro)powder particles are further comminuted, wherein the sections in immediate proximity or at another location are connected via a radical coupling reaction to olefinically unsaturated double bonds under mechanical stress, in particular rubbing, and are thus fixed at the plastic surface, and as a result a further disaggregation and distribution on the desired plastic surface or a subregion thereof emerges and/or is achieved.

On the other hand, it is advantageous if a most optimal possible coverage with coupled perfluoropolymer (micro) powder particles is already achieved during the production of the modified plastic surfaces under the production conditions according to the invention.

For the tribological modification of the entire surface or only locally, that is, in a limited manner of parts of the surface, of molded parts or component parts which have olefinically unsaturated double bonds at the surface, the following plastics can be used:

for molded parts composed of rubber (prior to vulcanization) and molded parts and component parts composed of elastomers/rubber such as for example SBR, NBR, HNBR, XNBR, EPDM, BR, IR, NR and other butadiene and/or isoprene copolymers or butadiene and/or isoprene terpolymers and mixtures thereof which have olefinically unsaturated groups in the side chain and/or in the main chain, as well as mixtures with other polymers for molded parts and component parts composed of thermoplastic elastomer (TPE-S→styrene block copolymers) such as for example SBS, SEBS, SEPS, SEEPS, MBS and mixtures thereof or with other polymers for molded parts composed of thermoplastic such as for example ABS and blends of ABS with PA or ABS and PC for molded parts and component parts composed of thermoset and specifically of fiber-reinforced thermosets such as for example BMC (bulk molding compound) or SMC (sheet molding compound) on a UP (unsaturated polyester) resin base or vinyl ester resin base as a pre-preg and/or cured material that still has olefinically unsaturated double bonds at the surface, or on an epoxy resin base as a pre-preg and/or cured material, wherein after subsequent modification the surface has groups with olefinically unsaturated double bonds.

In the method according to the invention for producing surface-modified plastics in the form of molded parts and component parts, a prior bulk-modification with perfluoropolymer, as is described in the prior art, is not necessary and also not advisable, since in the application cases the perfluoropolymer is to become effective at the surface, and the emergence of the tribological properties is not supposed to be delayed until after a break-in wear. Primarily for soft materials such as elastomer/rubber or TPE, with the materials bulk-modified with chemically coupled perfluoropolymers there still occurs the phenomenon according to which the chemically coupled perfluoropolymer particles are present such that they are encapsulated by the matrix polymer and the solid lubricant is only slightly active or no longer effectively so.

Experiments for the bulk modification of NBR with perfluoropolymer (micro)powder showed that in this case perfluoropolymer (micro)powders and specifically PTFE micropowders with a low radical concentration at $<10^{17}$ spin/$g_{PTFE}$ and preferably $<10^{16}$ spin/$g_{PTFE}$ are tribologically more effective and exhibited the best sliding friction and wear properties in the block/ring test, since the solid lubricant particles are not present such that they are "polymerized over and encapsulated," that is, grafted over.

In complete contrast to the plastic surfaces according to the invention and the method for the production thereof, the sliding friction coefficients and also the wear were lower for these materials. On the other hand, when PTFE micropowder with spin numbers >(greater than) $10^{17}$ spin/$g_{PTFE}$ and above all with spin numbers >(greater than) $10^{18}$ spin/$g_{PTFE}$ is worked into NBR, the sliding friction coefficients are slightly reduced, but the wear in the block/ring test increases markedly, which is attributed to the more highly encapsulated solid lubricant particles. The materials surface-modified according to the invention do not exhibit these disadvantages; instead, better sliding friction and wear properties are achieved when the radical concentrations are in fact higher. With an addition or in the presence of oils or greases, it has been shown that the coupled perfluoropolymer particles also function to a certain extent as oil storage, which significantly improves the tribological properties, primarily with regard to break-in characteristics or under emergency running conditions. Surface-modified molded parts and component parts of this type have proven advantageous due to easier sliding, also under assembly conditions.

After the production according to the invention of the surface-modified plastics according to the invention, it was possible to verify chemically coupled perfluoropolymer (micro)powder particles for molded parts (plates) composed of EPDM, SBR, NBR, NR, SBS, SEBS and ABS on the surface via REM, EDX and ATR spectroscopy after the clearing of unbonded perfluoropolymer (micro)powder particles.

Without the mechanical stress via rubbing, no coupling of perfluoropolymer (micro)powder particles on the plastic surface was observed in comparative tests.

The radical coupling of the perfluoropolymer (micro) powders on the plastic surfaces according to the invention leads to an improvement of the sliding friction properties and to an increase in wear resistance in the block/ring test compared to the unmodified surfaces.

To further improve the wear resistance, it is advantageous to simultaneously utilize the chemically coupled perfluoropolymer (micro)powder particles as a storage medium for oils and greases as well as perfluoropolyether oil (PFPE). The PFPE is not compatible with the polymer matrices, does not dissolve in conventional oils, greases and solvents, and helps reduce the friction coefficient while simultaneously increasing the wear resistance.

The plastic surfaces modified via radical coupling with perfluoropolymer (micro)powder particles are produced according to the invention in that, for example, a PFA emulsion polymerizate (Dyneon/3M) is electron-irradiated with 500 kGy and a PTFE emulsion polymerizate (TF 2025, Dyneon/3M) is gamma-irradiated with 750 kGy in the presence of air. During the irradiation, with a degradation into micropowder thereby taking place, radicals are produced which in the presence of air are partially converted into peroxy radicals which are stable/durable at room temperature.

The annealing practiced in many cases according to the prior art must not be performed, since the generated perfluoropolymer (peroxy) radicals would otherwise be eliminated.

Thus, active perfluoropolymer (peroxy) radical centers are deliberately utilized for the coupling with olefinically unsaturated double bonds of groups on the plastics of the molded parts and component parts in that surfaces chemically modified with perfluoropolymer (micro)powder particles are produced via a radical coupling.

A surface modification of this type of perfluoropolymer (micro)powders on plastic surfaces with olefinically unsaturated groups was not yet achieved or described prior to the invention.

With the solution according to the invention, a high and stable degree of coverage with perfluoropolymer (micro) powder particles is obtained which cannot be achieved merely by a pressing and temperature increase according to the prior art.

As a result of the surface coupling, the molded parts and component parts exhibit improved mechanical properties with respect to compressive and tensile strength as well as rigidity compared to the materials bulk-modified with perfluoropolymer, since the matrix structure is not changed, and exhibit significantly better tribological (surface) properties. These products are of interest primarily for sliding friction processes. As a result of the radical coupling of the perfluoropolymer particles on the molded part surface and component part surface, an improvement in the wear resistance is achieved through the bonding, since the perfluoropolymer grain cannot be (completely) rubbed away by mechanical stress.

This can be applied for dynamic sealing systems with the plastic surface (regions) modified according to the invention for a longer service life, and can also be applied in the automotive industry to prevent the undesired stick-slip phenomena in the form of squeaking and/or creaking noises. In mechanical engineering in general, sliding surfaces, sliding blocks, wipers, etc. can be surface-modified according to the invention, and can thus be equipped with tribologically optimized surfaces. In many cases, lubricating lacquers have previously been used as an assembly aid for this purpose or for tribological break-in processes, which lacquers usually lose their effectiveness after only a brief period, however.

The invention is explained below in greater detail with the aid of several exemplary embodiments.

COMPARATIVE EXAMPLE 1

On a 60 m×60 mm steel plate, a vulcanized NBR plate with dimensions of 50 m×50 mm and a thickness of 2 mm is positioned and covered with a thin layer of PFA powder (PFA 6502 TAZ, 3M/Dyneon, electron-irradiated with 500 kGy) with a perfluoroalkyl (peroxy) radical concentration of $>10^{20}$ spin/$g_{PFA}$. A 60 m×60 mm steel plate is placed thereon. On this steel plate, another vulcanized NBR plate with dimensions of 50 m×50 mm and a thickness of 2 mm is placed, whereon another 60 m×60 mm steel plate is placed. This stack is positioned in a press with a punch diameter of 120 mm and pressurized with 100 kN at room temperature. After 10 minutes, the pressure is released and the stack is removed. The NBR plate that was covered with PFA powder is removed and thoroughly washed with ethanol, with a light brushing thereby taking place using a paintbrush. After the drying of the plate, the surface feels like that of the starting material. Water does not drip off the surface, but rather flows away slowly as in the case of the starting material.

No PFA is visible across the entire area in the REM image, and no fluorine is visible in the EDX image. Except for faint traces close to the limit of detection, no fluorine is detectable in the EDX spectrum, which means that no surface modification took place under pressure only.

Tribological analyses in the block/ring test showed that stick-slip phenomena occur, and that no differences from the starting material emerge in terms of the sliding friction properties.

COMPARATIVE EXAMPLE 2

On a 60 m×60 mm steel plate, a vulcanized NBR plate with dimensions of 50 m×50 mm and a thickness of 2 mm is positioned and covered with a thin layer of PFA powder (PFA 6502 TAZ, 3M/Dyneon, electron-irradiated with 500 kGy) with a perfluoroalkyl (peroxy) radical concentration of >$10^{20}$ spin/$g_{PFA}$. A 60 m×60 mm steel plate is placed thereon. On this steel plate, another vulcanized NBR plate with dimensions of 50 m×50 mm and a thickness of 2 mm is placed, whereon another 60 m×60 mm steel plate is placed. This stack is positioned in a press with a punch diameter of 120 mm and pressurized with 100 kN at a temperature of 80° C. After 10 minutes, the pressure is released and the stack is removed. The NBR plate that was covered with PFA powder is removed and thoroughly washed with ethanol, with a light brushing thereby taking place using a paintbrush. After the drying of the plate, the surface feels like that of the starting material.

The results are analogous to Comparative Example 1, which means that no surface modification took place under pressure and temperature only, nor did any differences from the starting material emerge in terms of the sliding friction properties.

COMPARATIVE EXAMPLE 3

On a 60 m×60 mm steel plate, a vulcanized NBR plate with dimensions of 50 m×50 mm and a thickness of 2 mm is positioned and covered with a thin layer of PTFE powder (TF9205, 3M/Dyneon, not irradiated, thermomechanically degraded, without radicals). A 60 m×60 mm steel plate is placed thereon. On this steel plate, another vulcanized NBR plate with dimensions of 50 m×50 mm and a thickness of 2 mm is placed, whereon another 60 m×60 mm steel plate is placed. This stack is positioned in a press with a punch diameter of 120 mm and pressurized with 100 kN at a temperature of 120° C. A vibrator is then positioned along the middle plate, with which vibrator this plate is induced to vibrate. After 10 minutes, the test is ended, the pressure is released, and the stack is removed. The NBR plate that was covered with TF9205 powder is removed and thoroughly washed with ethanol, with a light brushing thereby taking place using a paintbrush. After the drying of the plate, the surface feels like that of the starting material.

The results are analogous to Comparative Example 1, which means that no surface modification took place with radical-free perfluoropolymer powder under pressure, temperature and shearing, nor did any differences from the starting material emerge in terms of the sliding friction properties.

EXAMPLE 1

Analogously to Comparative Example 1, the stack is prepared, positioned in the press and pressurized at room temperature under the same conditions. A vibrator is then positioned along the middle plate, with which vibrator this plate is induced to vibrate. After 10 minutes, the pressure is released and the stack is removed. The NBR plate that was covered with PFA powder (PFA 6502 TAZ, 3M/Dyneon, electron-irradiated with 500 kGy) with a perfluoroalkyl (peroxy) radical concentration of >$10^{20}$ spin/$g_{PFA}$ is removed and thoroughly washed with ethanol, with a light brushing thereby taking place using a paintbrush. After the drying of the plate, a glossy surface is visible which feels very smooth and on which the water drips off.

PFA particles are visible across the entire area in the REM image, and in the EDX image fluorine can be seen distributed very intensively and uniformly on the NBR surface. In the EDX spectrum, a marked fluorine peak is detectable, which means that a surface modification was achieved under pressure and vibration (shearing), even without temperature.

Tribological analyses in the block/ring test showed that no stick-slip phenomena emerge with these surface-modified NBR materials. Sliding friction coefficients between 0.20 and 0.23 were measured, which means that these surface-modified NBR materials differ in terms of the sliding friction properties compared to the unmodified starting material.

EXAMPLE 2

On a 100 m×100 mm steel plate, a vulcanized NR plate with dimensions of 50 m×50 mm and a thickness of 2 mm is positioned and covered by and screwed together with a 100 mm×100 mm steel plate which at the center has a circular hole as a window with a diameter of 20 mm, such that the NR is only visible in the opening. The 2 steel plates with the NR sample are fixed on a hot stage and heated to 100° C. On the visible/accessible NR in the window, PTFE micropowder (Zonyl MP 1200, DuPont, previously radiation-modified by the manufacturer, spin number of 1.37×$10^{18}$ spin/$g_{PTFE}$) is then added and rubbed in on the NR surface in a circular motion using a stiff brush. After 2 minutes, the test is stopped and the NR plate is removed. The NR plate that was locally covered with PTFE powder, is suctioned and thoroughly washed with ethanol, with a light brushing thereby taking place using a paintbrush. After the drying of the plate, the locally treated surface is visible as a glossy area which feels very smooth and from which the water drips off in contrast to the untreated border zones.

PTFE particles are visible across the entire area in the REM image, and in the EDX image fluorine can be seen distributed intensively and uniformly on the NR surface. In the EDX spectrum of the locally treated surface, a marked fluorine peak is detectable, which means that a surface modification was achieved under pressure, temperature, and friction (shearing). Tribological analyses in the block/ring test showed that no stick-slip phenomena emerge with these surface-modified NR materials. Sliding friction coefficients between 0.22 and 0.25 were measured, which means that these surface-modified NR materials differ in terms of the sliding friction properties compared to the unmodified starting material.

EXAMPLE 3

On a 100 m×100 mm steel plate, a vulcanized SBR plate with dimensions of 50 m×50 mm and a thickness of 2 mm is positioned and covered by and screwed together with a 100 mm×100 mm steel plate which at the center has a circular hole as a window with a diameter of 20 mm, such that the SBR is only visible in the opening. The 2 steel plates with the SBR sample are fixed on a hot stage and heated to 50° C. On the visible/accessible SBR in the window, PTFE micropowder (Algoflon L620, Solvay, previously radiation-modified by the manufacturer, spin number of $6.5\times10^{19}$ spin/$g_{PTFE}$) and steel balls with a diameter of 0.5 mm are then added. With a circular plastic punch (PA66/30GF), the steel balls are moved with the PTFE in a rolling manner on the surface under pressure and with a circular motion, such that the PTFE micropowder is treated on the accessible surface of the SBR. After approx. 5 minutes, the test is stopped, the steel balls are removed using a magnet, and the excess PTFE is suctioned away. The SBR plate is removed, and the site locally treated with PTFE powder is thoroughly washed with ethanol, with a light brushing thereby taking place using a paintbrush. After the drying of the plate, the locally treated surface is visible as a glossy area which feels very smooth and on which the water drips off in contrast to the untreated border zones.

PTFE particles are visible across the entire area in the REM image, and in the EDX image fluorine can be seen distributed intensively and uniformly on the SBR surface. In the EDX spectrum of the locally treated surface, a marked fluorine peak is detectable, which means that a surface modification was achieved under pressure, temperature, and friction (shearing).

Tribological analyses in the block/ring test showed that no stick-slip phenomena emerge with these surface-modified SBR materials. Sliding friction coefficients between 0.22 and 0.24 were measured, which means that these surface-modified SBR materials differ in terms of the sliding friction properties compared to the unmodified starting material.

EXAMPLE 4

An ABS plate with dimensions of 50 m×50 mm and a thickness of 2 mm is covered by and screwed together with a 50 m×50 mm steel plate which at the center has a circular hole as a window with a diameter of 20 mm, such that the ABS is only visible in the opening. On the visible/accessible ABS in the window, PFA micropowder (PFA 6502 TAZ, 3M/Dyneon, electron-irradiated with 500 kGy) with a perfluoroalkyl (peroxy) radical concentration of >$10^{20}$ spin/gpFA, which powder was previously processed with PAO (polyalphaolefin oil) into paste, is then applied as a paste in a thin layer. Using a sonotrode, the PFA paste on the ABS surface is subjected to an ultrasound treatment with short pulses under light pressure and with a circular motion. After approx. 2 minutes, the test is stopped. The ABS plate that was locally treated with PFA powder paste is first thoroughly washed with naphtha and then with ethanol, with a light brushing thereby taking place using a paintbrush. After the drying of the plate, the locally treated surface is visible as a glossy area which feels smooth and on which the water drips off in contrast to the untreated ABS border zones.

PFA particles are visible across the entire area in the REM image, and in the EDX image fluorine can be seen distributed intensively and uniformly on the locally treated ABS surface. In the EDX spectrum of the locally treated surface, a marked fluorine peak is detectable, which means that a surface modification was achieved with the ultrasound treatment.

Tribological analyses in the block/ring test showed that no stick-slip phenomena emerge with these surface-modified ABS materials. Sliding friction coefficients between 0.18 and 0.22 and wear coefficients of 1.8 to $6.1\times10^{-6}$ mm$^3$/Nm were measured, which means that these surface-modified ABS materials differ in terms of the sliding friction and wear properties compared to the unmodified ABS starting material. When unmodified, ABS materials as amorphous materials are not suitable as tribomaterial with regard to sliding friction and wear.

EXAMPLE 5

A partially cured SMC plate on a UP resin base with dimensions of 100 m×100 mm and a thickness of 2 mm is covered by and screwed together with a 100 m×100 mm steel plate which at the center has a rectangular 20 m×50 mm gap as a window, such that the SMC is only visible in the opening. On the visible/accessible SMC in the window, PFA micropowder (PFA 6502 TAZ, 3M/Dyneon, electron-irradiated with 500 kGy) with a perfluoroalkyl (peroxy) radical concentration of >$10^{20}$ spin/$g_{PFA}$, which powder was previously wetted with ethanol and processed with water into paste, is then applied as a paste in a thin layer. Using a sonotrode, the PFA paste on the SMC surface is subjected to an ultrasound treatment under light pressure and with a circular motion. After approx. 1 minute, the test is stopped. The SMC plate that was locally treated with PFA is rinsed with an aqueous surfactant solution. After the drying, the plate undergoes final curing in a mold. Afterwards, the plate is thoroughly washed with ethanol, with a light brushing thereby taking place using a paintbrush. After the drying of the plate, the locally treated surface is visible as a glossy area which feels very smooth and on which the water drips off in contrast to the untreated border zones.

PFA particles are visible across the entire area in the REM image, and in the EDX image fluorine can be seen distributed intensively and uniformly on the treated SMC surface. In the EDX spectrum of the locally treated surface, a marked fluorine peak is detectable, which means that a surface modification was achieved with the ultrasound treatment.

Tribological analyses in the block/ring test showed that no stick-slip phenomena emerge with these surface-modified SMC materials. Sliding friction coefficients between 0.18 and 0.21 and wear coefficients of 0.48 to $1.51\times10^{-7}$ mm$^3$/Nm were measured, which means that these surface-modified SMC materials differ in terms of the sliding friction properties compared to the unmodified starting material.

The invention claimed is:

1. Modified plastic surfaces with perfluoropolymers in which modified perfluoropolymer (micro)powders are present at the surface of plastics that comprise olefinically unsaturated double bonds at least at the surface such that the modified perfluoropolymer (micro)powders are chemically covalently bonded via a radical coupling of the olefinically unsaturated double bonds with perfluoropolymer (peroxy) radicals of the modified perfluoropolymer (micro)powders after a reactive conversion under mechanical stress at room temperature.

2. The modified plastic surfaces according to claim 1 in which molded parts and/or component parts composed of polymers having groups with olefinically unsaturated double bonds in the side chain and/or in the main chain at the surface are present as plastics.

3. The modified plastic surfaces according to claim 2 in which elastomers/rubber or rubber prior to vulcanization or thermoplastic elastomers or thermoplastics or thermosets are present as polymers with olefinically unsaturated double bonds, each at the surface.

4. The modified plastic surfaces according to claim 2 in which SBR (styrene-butadiene rubber), NBR (nitrile rubber), HNBR (hydrogenated nitrile rubber), XNBR (carboxylated nitrile rubber), EPDM (ethylene propylene diene rubber), BR (polybutadiene rubber), IR (isoprene rubber), NR (natural rubber), SBS (styrene-butadiene-styrene copolymer), SEBS (styrene-ethylene-butylene-styrene copolymer), SEPS (styrene-ethylene-propylene-styrene copolymer), SEEPS (styrene-ethylene-ethylene-propylene-styrene copolymer), MBS (methacrylate-butadiene-styrene copolymer) and mixtures thereof, ABS (acrylonitrile butadiene-styrene copolymer) and blends of ABS with PA (polyamide) or ABS and PC (polycarbonate), BMC (bulk molding compound) or SMC (sheet molding compound) on a UP (unsaturated polyester) resin base or vinyl ester resin base as a pre-preg and/or cured material that still has olefinically unsaturated double bonds at the surface, or on an epoxy resin base as a pre-preg and/or cured material, wherein after subsequent modification the surface has groups with olefinically unsaturated double bonds, are present as polymers.

5. The modified plastic surfaces according to claim 1 in which modified perfluoropolymer (micro)powders are present which have been modified by means of radiation-chemical and/or plasma-chemical treatment.

6. The modified plastic surfaces according to claim 1 in which modified PTFE and/or PFA and/or FEP are present as modified perfluoropolymer (micro)powders.

7. The modified plastic surfaces according to claim 1 in which the surface of the plastics is at least partially or locally covered and covalently coupled with modified perfluoropolymer (micro)powder.

8. The modified plastic surfaces according to claim 1 in which modified perfluoropolymer (micro)powders with particle sizes in the range from 60 nm to 500 µm are present.

9. A method for producing modified plastic surfaces with perfluoropolymer (micro)powders, in which method modified perfluoropolymer (micro)powders with a perfluoropolymer (peroxy) radical concentration of $>5 \cdot 10^{16}$ spin/$g_{perfluorompolymer}$ are applied at room temperature to a solid surface of plastics that comprise olefinically unsaturated double bonds at least at the surface and a reactive conversion is carried out under mechanical stress during and/or after the application of the modified perfluoropolymer (micro)powders, wherein a subsequent annealing of the plastic surface with the modified perfluoropolymer (micro)powders is excluded.

10. The method according to claim 9 in which radiation chemical- and/or plasma chemical-modified PTFE (micro)powder and/or PFA (micro)powder and/or FEP (micro)powder are used as modified perfluoropolymer (micro)powders.

11. The method according to claim 9 in which the perfluoropolymer (micro)powders have been modified with radiation dose of >50 kGy and have a concentration of $>5 \cdot 10^{16}$ spin/$g_{perfluorompolymer}$ of perfluoropolymer (peroxy) radicals.

12. The method according to claim 9 in which the perfluoropolymer (micro)powders have been radiation-chemically modified in the presence of reactants.

13. The method according to claim 9 in which molded parts and/or component parts composed of polymers having groups with olefinically unsaturated double bonds in the side chain and/or in the main chain at least at the surface are used as plastics and modified.

14. The method according to claim 13 in which elastomers/rubber or rubber prior to vulcanization or thermoplastic elastomers or thermoplastics or thermosets are used as polymers with olefinically unsaturated double bonds, each at the surface.

15. The method according to claim 13 in which SBR (styrene-butadiene rubber), NBR (nitrile rubber), HNBR (hydrogenated nitrile rubber), XNBR (carboxylated nitrile rubber), EPDM (ethylene propylene diene rubber), BR (polybutadiene rubber), IR (isoprene rubber), NR (natural rubber), SBS (styrene-butadiene-styrene copolymer), SEBS (styrene-ethylene-butylene-styrene copolymer), SEPS (styrene-ethylene-propylene-styrene copolymer), SEEPS (styrene-ethylene-ethylene-propylene-styrene copolymer), MBS (methacrylate-butadiene-styrene copolymer) and mixtures thereof, ABS (acrylonitrile butadiene-styrene copolymer) and blends of ABS with PA (polyamide) or ABS and PC (polycarbonate), BMC (bulk molding compound) or SMC (sheet molding compound) on a UP (unsaturated polyester) resin base or vinyl ester resin base as a pre-preg and/or cured material that still has olefinically unsaturated double bonds at the surface, or on an epoxy resin base as a pre-preg and/or cured material, wherein after subsequent modification the surface has groups with olefinically unsaturated double bonds, are used as polymers.

16. The method according to claim 9 in which the modified perfluoropolymer (micro)powders are applied to the plastic surface at room temperature.

17. The method according to claim 9 in which modified perfluoropolymer (micro)powders are applied to a solid plastic surface which has a temperature of up to 200° C.

18. The method according to claim 9 in which the reactive conversion is achieved under mechanical stress
via compressive stress without or with carrier bodies composed of metal and/or ceramic and/or plastic and/or
via stressing by accelerated carrier bodies composed of metal and/or ceramic and/or plastic,
wherein the mechanical stress is applied during and/or after the application of the radiation-chemically and/or plasma-chemically modified perfluoropolymer (micro)powders to the solid plastic surface.

19. The method according to claim 9 in which the application of the modified perfluoropolymer (micro)powders is carried out before the reactive conversion under mechanical stress and the modified perfluoropolymer (micro)powder is positioned on the solid plastic surface via electrostatic adsorption.

* * * * *